United States Patent [19]

Ray

[11] Patent Number: 4,598,813
[45] Date of Patent: Jul. 8, 1986

[54] VIBRATION DAMPING NEST FOR AXIAL LEAD COMPONENTS

[75] Inventor: Francis M. Ray, Glenview, Ill.
[73] Assignee: Zenith Electronics Corporation, Glenview, Ill.
[21] Appl. No.: 679,501
[22] Filed: Dec. 6, 1984
[51] Int. Cl.$^4$ ............................................. B65G 47/00
[52] U.S. Cl. ................................... 198/345; 198/394; 198/406; 198/525; 198/535; 193/44
[58] Field of Search ...................... 198/345, 346.2, 379, 198/394, 395, 399, 381, 468.2, 468.4, 468.5, 525, 836, 406, 409, 434, 443, 774, 956, 534, 535; 29/759; 414/745, 778; 193/44

[56] References Cited

U.S. PATENT DOCUMENTS

| | | | |
|---|---|---|---|
| 2,877,884 | 3/1959 | Esenwein | 198/395 |
| 3,236,374 | 2/1966 | Zimmerman et al. | 198/379 |
| 3,511,369 | 5/1970 | Chilton | 198/345 |
| 3,528,572 | 9/1970 | Mosterd | 198/443 |
| 3,722,662 | 3/1973 | Wakabayashi et al. | 198/774 |
| 3,880,074 | 4/1975 | Seifert | 198/345 |
| 3,960,267 | 6/1976 | Valo | 198/409 |
| 4,294,149 | 10/1981 | Olsson | 414/745 |

Primary Examiner—Joseph E. Valenza
Attorney, Agent, or Firm—Cornelius J. O'Connor

[57] ABSTRACT

A vibration damping nest is adapted for receiving axial lead components deposited upon a conveyor assembly by an automatic grasping and positioning device such as robotic pincers. The conveyor assembly, such as a walking beam, is provided with a plurality of grooves along the length thereof which are aligned perpendicular to the length and direction of displacement of the walking beam and are adapted to receive an elongated, linear electronic component deposited thereon. The vibration damping nest includes a pair of pivoting plates positioned on respective sides of the walking beam immediately adjacent thereto. An upper edge of each of the plates includes a generally V-shaped recessed portion for receiving a respective axial lead of a component. Suspended from each pivoting plate is a biasing weight for urging the plate in a generally vertical orientation wherein the V-shaped upper edge portions of the plates define a component drop position across the walking beam assembly. The V-shaped upper edge portion of each plate in combination with its pivoting mount arrangement permits it to accommodate variations in positioning of the automatic grasping and positioning device when a component is deposited therefrom by cradling the deposited component in a manner which substantially reduces the possibility of its bouncing out of the damping nest, while positioning the component for subsequent engagement and removal further along the length of the walking beam.

16 Claims, 4 Drawing Figures

VIBRATION DAMPING NEST FOR AXIAL LEAD COMPONENTS

BACKGROUND OF THE INVENTION

This invention relates generally to the automatic handling and manipulation of electronic components and is particularly directed to an arrangement for receiving and positioning axial lead electronic components either on a conveyor system or at a stationary work station.

Automatic procedures and apparatus are increasingly being used in the fabrication and testing of electronic components as well as in the assembly of these components into an operating device. This automation is desirable because of the increased efficiency, reliability, accuracy and speed provided in these heretofore labor-intensive operations. These automated procedures typically involve transporting the components to various stations where they are sequentially manipulated in providing for the fabrication, testing, and insertion of the component in an electronic device. The component is typically transported by means of a conveyor arrangement such as a walking beam for moving the component from station to station. Each component is then sequentially manipulated such as by a robotic grasping arm with pincers for positioning or orienting the component as desired.

In these automatic systems which are frequently microcomputer-controlled, accurate positioning of the electronic components is essential for proper operation. For example, a component on the conveyor system must consistently be positioned within system tolerances at various locations for engagement by component grasping means. Each component must also be accurately and reliably positioned along the length of the conveyor system to provide proper spacing between components and ensure proper timing among the various procedural steps involved. Inherent tolerances in remotely controlled automatic positioning and grasping apparatus, however, frequently results in the inaccurate deposit of a component along the length of the conveyor system. In addition, the inaccurate deposit of a component upon the conveyor system may cause the component to fall or bounce from the conveyor and prevent the completion of its fabrication or subsequent testing and assembly. The loss of even one component, of course, not only reduces the efficiency and speed of the process, but also increases manufacturing costs.

The present invention overcomes the aforementioned limitations of the prior art by providing a vibration damping nest for the accurate and reliable positioning of axial lead electronic components upon either an intermittent or continuously moving conveyor assembly such as a walking beam or at a stationary work station. The vibration damping nest is adapted to receive and support axial lead components deposited upon the in-line conveyor assembly within a wide range of positioning limits of the component deposit device. Once thus positioned upon the conveyor assembly, an electronic component may then subsequently be engaged by another vibration damping nest further along the length of the conveyor to facilitate its removal from the conveyor assembly by component grasping and engagement means.

OBJECTS OF THE INVENTION

Accordingly, it is an object of the present invention to provide improved automatic mechanical handling of electronic components in the manufacture, testing and assembly thereof.

It is another object of the present invention to provide for the accurate and reliable positioning of electronic components on a conveyor type of transport system.

Yet another object of the present invention is to provide a vibration damping nest for receiving axial lead electronic components deposited upon a conveyor transport system.

Still another object of the present invention is to provide an improved electronic component handling and positioning arrangement for use in a component transport walking beam. of the Drawings

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
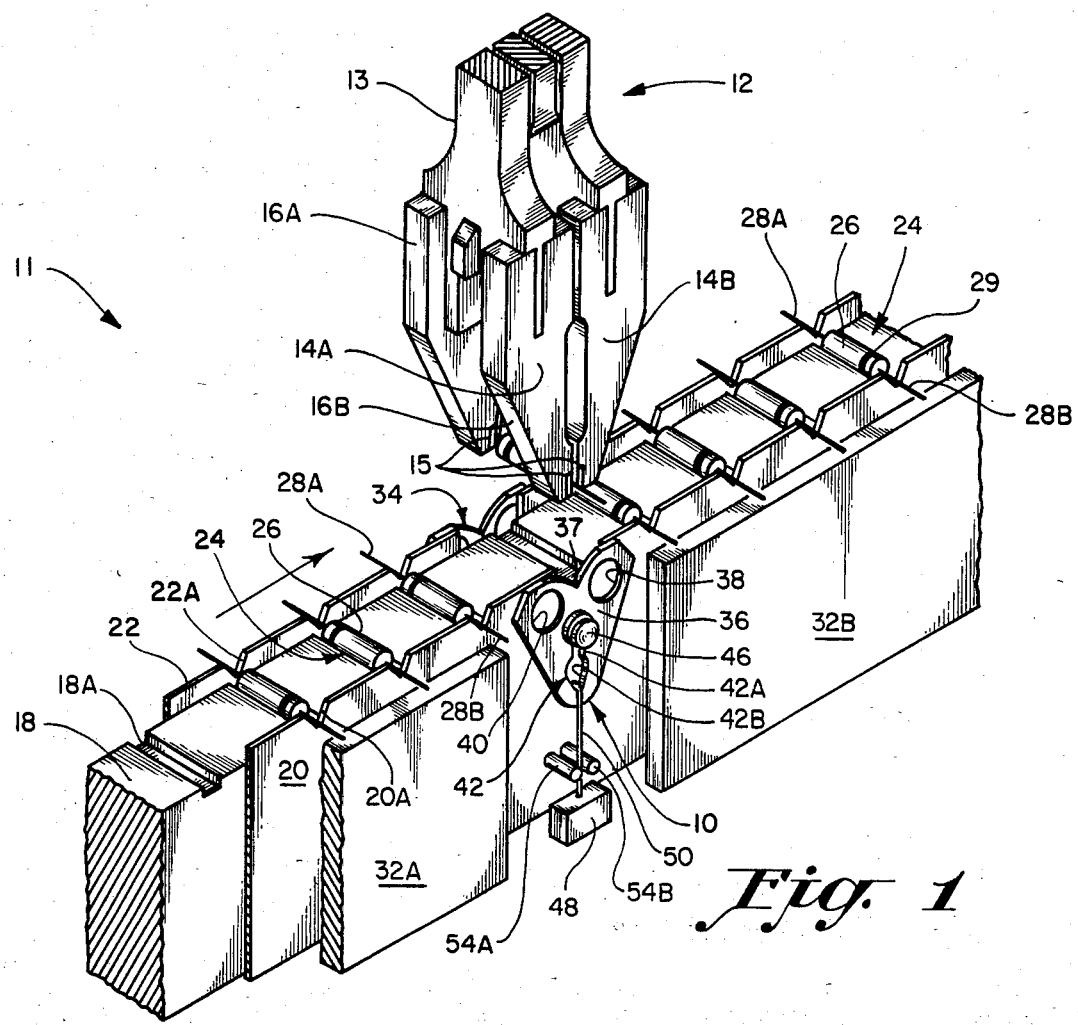
FIG. 1 is an upper perspective view of a vibration damping nest for axial lead components in accordance with the present invention for use in a conveyor type of electronic component transport system.

Referring to FIG. 1, there is shown an upper perspective view of a vibration damping nest 10 for use in an electronic component conveyor transport system.

A plurality of electronic components 24 each comprised of a component body 26 and a pair of axial leads 28A, 28B positioned in opposing, facing ends thereof are transported by the conveyor system 11 in the direction of the arrow shown in FIG. 1. Each of the electronic components 24 may further include an orientation stripe 29 for providing a visual indication of the orientation of the component. For example, in the case of diodes, the orientation stripe 29 may be positioned adjacent to the lead connected to the diode's cathode. Axial lead components include, but are not necessarily limited to, diodes, capacitors, resistors, and other types of semiconductors as well as various battery cells. The accurate and reliable positioning of the axial lead components upon the component conveyor system provided by the vibration damping next 10 of the present invention may be used at virtually any step or operation in the manufacture, testing, or assembling of such components into an electronic device.

The conveyor system 11 includes a walking beam 18 which has along its length on an upper surface thereof a plurality of grooves, or slots, 18A. Each of these grooves 18A is oriented generally transverse to the direction of motion (indicated by the arrow in FIG. 1), of the walking beam 18. Positioned within each of these grooves 18A and along the length thereof is a respective axial lead component 24. Located adjacent to respective lateral portions of the walking beam 18 are right and left rails 20, 22, where relative orientations are taken as the conveyor transport system is viewed along the direction of displacement of the components thereon. Each of the right and left rails 20, 22 is provided with a plurality of respective notches 20A, 22A on an upper edge thereof. With the grooves 18A within the upper surface of the walking beam 18 adapted to receive a component body 26, each pair of aligned notches 20A, 22A within the right and left rails 20, 22 is adapted to receive and support the axial leads of an electronic component.

Components are linearly displaced along the conveyor system 11 in the following manner. A drive mechanism (not shown) coupled to the walking beam 18 elevates the walking beam and displaces it in the direction of the arrow in FIG. 1. With the walking beam 18 thus raised, the respective notches 20A, 22A in the right and left rails 20, 22 no longer engage the axial leads of a component. The component may then be displaced above and along the length of the right and left rails 20, 22. Once each component has been displaced rightward to a position immediately above the next pair of notches within the right and left rails 20, 22, the walking beam 18 is lowered by the driving mechanism to permit each component to be supported by the facing notches in the right and left rails and to be removed from a respective groove 18A in the upper surface of the walking beam 18. The walking beam 18 is then displaced in a direction opposite to the arrow shown in FIG. 1 so that each groove in an upper surface thereof is positioned immediately adjacent to the pair of rail notches between which it was originally positioned. This reciprocating motion of the walking beam 18 permits each of the electronic components 24 to be "walked" down the right and left rails 20, 22 in a repetitive, sequential manner. Positioned along lateral portions of the conveyor assembly and in contact therewith are right and left mounting brackets. Right hand mounting brackets are shown as elements 32A and 32B in FIG. 1.

Positioned immediately above the conveyor system 11 is a gripper arm 12. The gripper arm 12 includes an upper housing 13 to which are coupled and from which are suspended first and second pairs of pincers. This coupled pincer arrangement includes right pincers 14A, 14B and left pincers 16A, 16B. The right pincers 14A, 14B are positioned immediately above and are adapted to grasp one of the axial leads 28B extending from an electronic component 24. Similarly, the left pincers 16A, 16B are positioned immediately above and are adapted to engage the other axial lead 28A extending from an electronic component 24. Each pair of pincers is pivotally coupled to the upper housing 13 of the gripper arm 12 so as to engage a respective axial lead of an electronic component when lowered into position immediately adjacent to the body 26 of an electronic component. The gripper arm 12 is displaced vertically relative to the walking beam 18 and any displacement of the gripper arm along the length of the walking beam represents a limitation in the positioning accuracy of the gripper arm inherent in virtually all automatic component handling systems.

In general, when a component is positioned immediately beneath the gripper arm 12, the gripper arm, with the respective pairs of pincers displaced from one another, is lowered so as to be in a position to engage the axial leads of the component positioned upon the vibration damping nest 10 of the present invention. The lower, inner portion of each pincer element is provided with a respective conductive insert 15. Each of the axial leads of a given electronic component is grasped between a respective pair of pincers so that each lead is in contact with a given pair of conductive inserts 15. Each of the conductive inserts 15 is coupled to appropriate circuitry (not shown) to provide a voltage across the electronic component in testing its electrical characteristics. For example, in the case of a diode a voltage may be applied across the component in a rapidly sequenced, alternating manner in testing for the polarity of the diode. Once the polarity of the diode as positioned within the gripper arm 12 is determined, the gripper arm may then be either maintained in position or rotated by means of an appropriate rotational drive mechanism (not shown) to position the electronic component upon the walking beam 18 in a desired orientation. For example, the electronic components positioned upon the walking beam 18 to the left of the gripper arm 12 are randomly oriented thereon as indicated by the positions of the orientation stripes 29 on each component. Once the component is positioned immediately beneath the gripper arm 12 and grasped therein to permit its actual orientation to be electrically determined, the gripper arm 12 then deposits that component in a predetermined orientation upon the walking beam 18 as shown by the position of the component orientation stripes 29 on that portion of the walking beam to the right of the gripper arm 12 in FIG. 1. Other electrical tests well known to those skilled in the art may be performed on these and other components in order to determine the orientation of the component upon the walking beam 18 and to provide for its re-positioning thereon, if necessary, for ensuring a uniform orientation of electronic components in the conveyor system.

Figure 2:
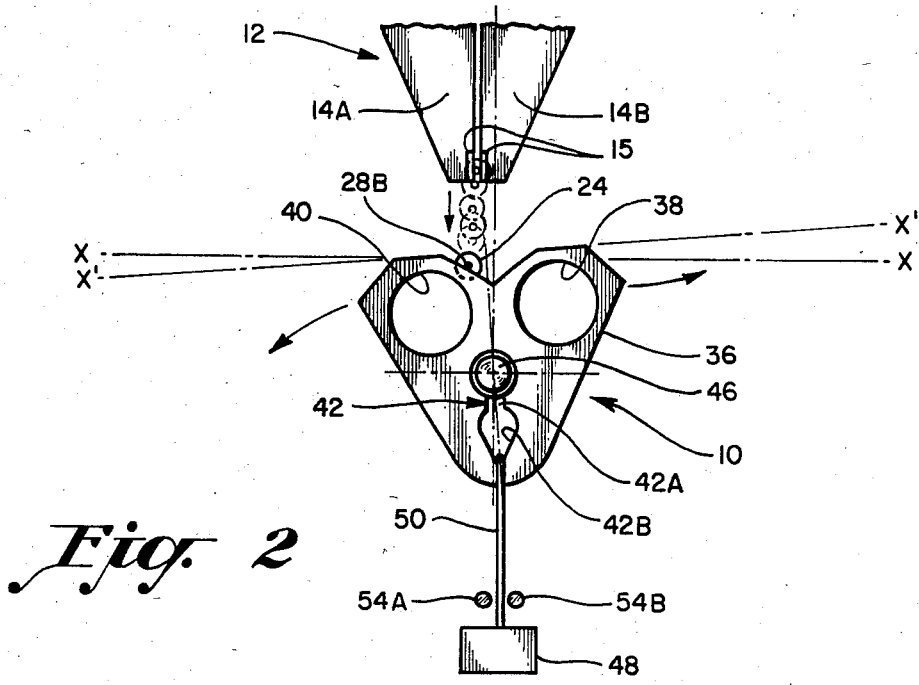
FIG. 2 is a lateral view of the vibration damping nest for axial lead components of FIG. 1 illustrating the off-center deposit of an electronic component thereon.
Figure 3:
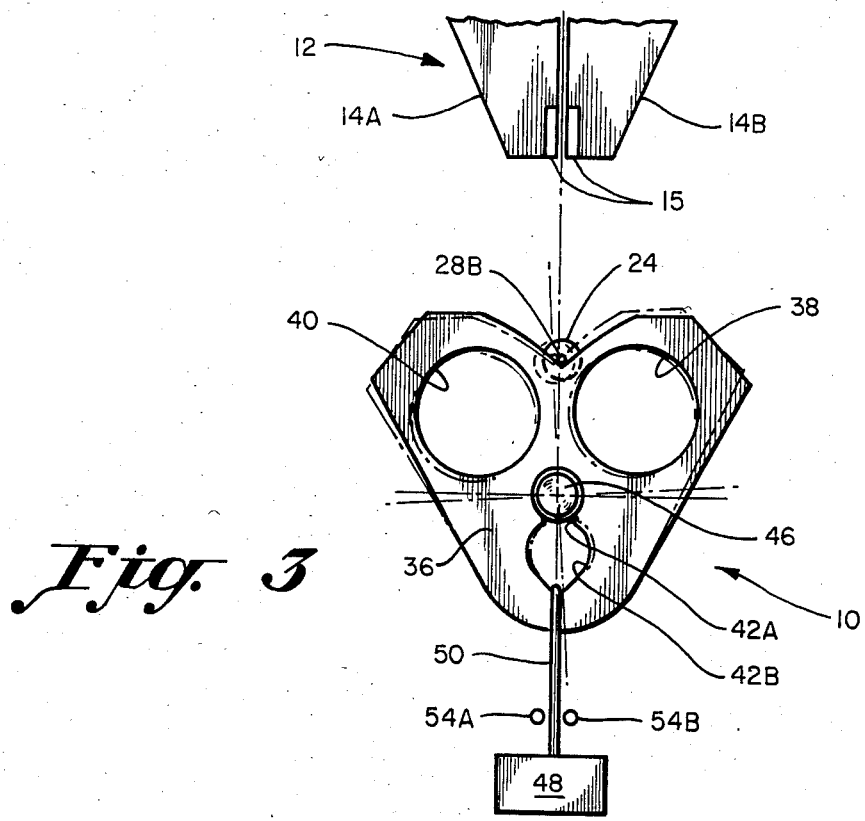
FIG. 3 is a lateral view of the vibration damping nest for axial lead components of FIG. 2 illustrating its pivoting movement upon receipt of an electronic component.

Referring to FIGS. 1, 2 and 3, the configuration and operation of the vibration damping nest 10 of the present invention in stably and securely receiving and supporting an axial lead component deposited thereon will now be described in detail. The vibration damping nest 10 includes left and right damper plates 34, 36 pivotally coupled to respective left and right rails 22, 20 and positioned immediately adjacent to respective lateral portions of the walking beam 18. Each damper plate is coupled to a respective rail portion of the conveyor system 11 by means of a pivot pin 46. An upper edge of each of the left and right damper plates 34, 36 is provided with a recessed portion 37 in the general shape of a "V". The downward sloping, center directed upper edge portion of each of the damper plates is thus adapted to receive an axial lead of an electronic component and to position the component along a generally vertically oriented centerline extending through the damper plate. This characteristic of the vibration damping nest 10 is particularly illustrated in FIGS. 2 and 3. In FIG. 2, the line X—X represents the generally horizontal orientation of the upper, flat portion of the damper plate 36 prior to deposit of an electronic component 24 thereon. As shown in the figure, the gripper arm 12 is positioned slightly to the left of a vertical centerline extending through the damper plate 36 resulting in the off-center deposit of the electronic component 24 thereon. Upon impact of the component's axial lead 28B with the upper V-shaped notch 37 within the damper plate 36, the damper plate pivots in a counterclockwise direction in dissipating the downward momentum of the thus deposited electronic component which is thus prevented from bouncing out of the recessed upper portion of the damper plate 36.

Following initial contact of the axial lead 28B with the upper edge portion of the damper plate 36, the flat upper edge portion of the damper plate assumes the orientation of line X'—X' as shown in FIG. 2. The damper plate 36 thus assumes a slightly off-center, non-equilibrium pivotal orientation upon initial contact with the axial lead 28B of the deposited electronic component 24, followed by a reorientation of the pivoting damper plate 36 in a generally vertical orientation due to the biasing effect of a damper weight 48 suspended therefrom. The rotational displacement of the damper plate 36 thus converts the kinetic energy of the falling electronic component into rotational energy of the pivoting damper plate. This is shown in FIG. 3, where the off-center deposit of the electronic component 24 causing the counterclockwise rotation of the damper plate 36 is shown in dotted line form. Following initial contact of the axial lead 28B of the electronic component 24 with the damper plate 36, the electronic component is displaced toward the center of the V-shaped upper edge portion of the damper plate and the damper plate again assumes a generally vertical orientation as indicated by the solid line depiction in FIG. 3.

Each of the damper plates includes an aperture 42 positioned along the vertical centerline thereof and comprised of an elongated upper portion 42A and a lower, expanded portion 42B. The pivot pin 46, which is secured to an adjacent rail portion of the conveyor system and about which the damper plate 36 rotates, is positioned within the elongated upper portion 42A of the damper plate's center aperture 42. One end of a wire 50 is positioned within and coupled to the lower, expanded portion 42B of the damper plate's center aperture 42, with the other end of the wire 50 secured to a damper weight 48. With the damper weight 48 thus suspended from the damper plate 36, the damper plate is urged to a generally vertical orientation following the deposit of an electronic component on the upper edge thereof. This ensures that once the damper plate 36 has reached rotational equilibrium about the pivot pin 46, an electronic component will be positioned directly above the pivot pin 46 and along the vertical centerline of the damper plate.

Positioned on respective sides of the weight suspending wire 50 are first and second dowel pins 54A, 54B which limit the lateral displacement of the wire 50 arising from rotation of the damper plate 36. The dowel pins 54A, 54B also limit the lateral displacement of the damper weight 48 as well as the rotational displacement of the damper plate 36 in ensuring that the damper plate assumes a generally vertical orientation immediately following deposit of an electronic component thereon and that extended oscillation of the vibration damping nest 10 is avoided. Forward and aft apertures 38, 40 may be provided in an upper portion of the damper plate 36 in order to lower its center of gravity and reduce its tendency to oscillate following deposit of an electronic component thereon. Some oscillation of the damper plate is, of course, necessary in order to effectively dampen out the effect of impact of an electronic component thereon. However, the size of the damper weight 48 as well as the relative size of the forward and aft apertures 38, 40 therein may be selected so as to minimize the oscillatory action of the damper plate 36. This will ensure that the oscillating damping nest 10 reaches rotational equilibrium and assumes a generally vertical orientation so as to provide stable positioning of the electronic component on the conveyor transport system as quickly as possible.

Figure 4:
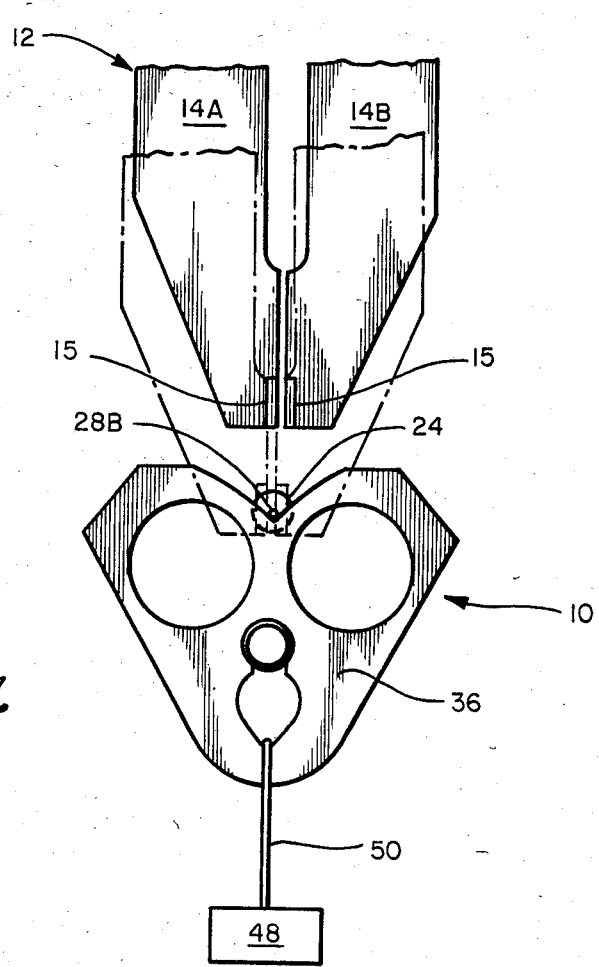
FIG. 4 is a lateral view of the vibration damping nest for axial lead components of FIG. 1 illustrating the engagement of an electronic component positioned thereon by a component grasping mechanism in removing the component from a conveyor type of transport system.

Referring to FIG. 4, there is shown the manner in which an electronic component 24 may be engaged by a gripper arm 12 and removed from the vibration damping nest 10 of the present invention. The gripper arm 12 is lowered from an upraised position to a position (shown in dotted line form) wherein the conductive inserts 15 within the pincers 14A, 14B are positioned immediately adjacent to the electronic component 24. The pincers are then displaced toward one another to permit the respective conductive inserts 15 to engage an axial lead 28B extending from the electronic component. With the axial leads of the electronic component 24 thus engaged, the electronic component may be removed from the vibration damping nest 10.

The pivoting nature of the damper plate 36 permits the electronic component 24 to be laterally displaced relative to the gripper arm 12 while remaining stably positioned upon the damper plate. Thus, if the center of the gripper arm 12 is laterally displaced from the vertical centerline of the damper plate 36 and the position of the electronic component 24 thereon, as the two pincers 14A, 14B move toward one another the electronic component 24 will initially be laterally displaced prior to being securely grasped between the pincers. This is due to the pivoting nature of the damper plate 36 which allows for the aforementioned lateral displacement of the electronic component 24 while it remains in stable position upon the damper plate. Thus, the pivoting nature of the vibration damping nest 10 compensates for the off-center positioning of the gripper arm 12 relative to the damper plates of the vibration damping nest in the removal of a component therefrom and prevents the axial leads of the electronic component from being bent when engaged by the gripper arm when it is positioned off-center with respect to the vibration damping nest 10.

There has thus been shown a vibration damping nest for receiving and supporting axial lead electronic components deposited upon a conveyor-type transport system by an automatic engaging and positioning device. While the vibration damping nest is disclosed herein for use with either an intermittent or continuously moving conveyor system, it may equally as well be used for the deposit or removal of an electronic component at a stationary work station. The vibration damping nest compensates for variations in the position of the automatic engaging and positioning device when a component is either deposited therefrom or engaged and picked up thereby by cradling an electronic component supported thereon in a manner which substantially reduces the possibility of its bouncing out of the damping nest during its deposit thereon or of being displaced from the damping nest during its removal therefrom. The vibration damping nest of the present invention is particularly adapted for use with axial lead electronic components transported on a walking beam type of conveyor system.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. In a system for transporting electronic components having a pair of axial leads, said system including conveyor means upon which the components are deposited by component gripper means, the improvement comprising:
   damper means pivotally positioned adjacent to respective lateral portions of the conveyor assembly and including a component drop zone defined by converging surfaces and positioned generally below a component drop position of the component gripper means along the conveyor assembly for receiving the axial leads of an electronic component deposited upon the conveyor assembly by the component gripper means; and
   biasing means coupled to said damper means for urging said damper means in a generally vertical orientation along said component drop position, wherein said damper means is free to pivot about said generally vertical orientation upon deposit of a component thereon when the component gripper means is positioned forward or aft of said component drop position in absorbing a substantial portion of the kinetic energy of the component and maintaining the deposited electronic component in position upon the conveyor assembly.

2. Apparatus as in claim 1 wherein said damper means includes a pair of damper plates each having a respective component drop zone, with each plate positioned on a respective side of the conveyor assembly and wherein each of the respective component drop zones includes an upper recessed edge portion of a damper plate defined by converging surfaces for receiving a respective axial lead of an electronic component and for maintaining the electronic component in position.

3. Apparatus as in claim 2 wherein each damper plate is coupled to a respective lateral portion of the conveyor means by means of a pivot pin.

4. Apparatus as in claim 2 wherein the converging surfaces of the upper recessed edge portions of said damper plates are generally V-shaped for directing an electronic component deposited thereon toward the center of said damper plate and maintaining the component thereat.

5. Apparatus as in claim 4 wherein the mass of said damper plates is determined by the weight of the electronic components, with the mass of said damper plates increasing for increased electronic component weights.

6. Apparatus as in claim 5 wherein said damper plates include at least one aperture in an upper portion thereof for fixing the mass and lowering the center of gravity of said damper plates for more efficient damping thereof.

7. Apparatus as in claim 1 wherein said biasing means includes a weighted body suspended from said damper means.

8. Apparatus of claim 7 wherein the weight of said body is determined by the weight of the electronic components and the mass of said damper means, with the weight of said body increasing for increased electronic component weight and damper means mass.

9. Apparatus of claim 7 further including a line for suspending said weighted body from said damping means and restraining means positioned on respective sides of said line for limiting the lateral displacement thereof.

10. Apparatus of claim 9 wherein said restraining means includes a pair of spaced fingers, with each finger positioned on a respective side of said line for limiting the lateral displacement thereof.

11. Apparatus of claim 1 wherein the conveyor means includes a reciprocally displaced walking beam having a plurality of slots along the length thereof within which the electronic components are positioned and transported.

12. In apparatus for receiving electronic components deposited by movable component gripper means and for positioning said electronic components for engagement and removal by the component gripper means therefrom, said electronic components having axial leads extending from respective ends thereof, the improvement comprising:
   a support structure positioned beneath the component gripper means;
   damper means pivotally coupled to said support structure and positioned generally below the component gripper means for supporting an electronic component deposited thereon, said damper means including a recessed drop zone defined by a pair of converging surfaces and positioned generally below a component drop position of the component gripper means for receiving and engaging a respective axial lead of an electronic component deposited by the component gripper means over a range of component gripper means lateral positions relative to the component drop position; and
   biasing means coupled to said damper means for urging said damper means in a generally vertical orientation, wherein said damper means is free to pivot about said generally vertical orientation upon deposit of a component thereon when the component gripper means drop position is laterally displaced from said component drop zone in absorbing a substantial portion of the kinetic energy of the component and maintaining the deposited electronic component in position upon the damper means.

13. Apparatus as in claim 12 wherein said damper means includes a pair of spaced damper plates, each damper plate having a pair of converging surfaces on an upper portion thereof for receiving and supporting a respective axial lead of an electronic component.

14. Apparatus as in claim 13 wherein each damper plate is coupled to said support structure by means of a pivot pin.

15. Apparatus as in claim 12 wherein said biasing means includes a weighted body suspended from said damper means.

16. Apparatus as in claim 15 further including restraining means mounted to said support structure and positioned on each side of said weighted body for limiting the lateral displacement thereof.

* * * * *